United States Patent
Lehnen et al.

[15] 3,652,064
[45] Mar. 28, 1972

[54] APPARATUS FOR CONVEYING PLASTIC MATERIAL

[72] Inventors: Josef Peter Lehnen, Verlautenheide by Aachen; Hans G. L. Menges, Laurensberg by Aachen; Engelbert G. Harms, Vaalserquartier by Aachen, all of Germany

[73] Assignee: Uniroyal Engelbert Deutschland AG, Aachen, Germany

[22] Filed: Mar. 5, 1970

[21] Appl. No.: 16,769

Related U.S. Application Data

[63] Continuation-in-part of Ser. No. 808,543, Mar. 19, 1969, abandoned.

[30] Foreign Application Priority Data

Mar. 12, 1969 Germany .................P 19 12 459.5
Mar. 22, 1968 Austria ....................A 2858/68

[52] U.S. Cl................259/109, 18/12 SM, 259/9, 198/213
[51] Int. Cl. ........................................................B01f 7/02
[58] Field of Search..............259/109, 110, 9, 10, 25, 26, 259/45, 46, 68, 69, 104, 2, 4–8, 16, 21–24, 32–34, 40–44, 64–67; 18/12 A, 12 SM, 30 SM; 198/213

[56] References Cited

UNITED STATES PATENTS

| | | | |
|---|---|---|---|
| 2,936,161 | 5/1960 | Cummings et al. | 259/109 |
| 3,023,455 | 3/1962 | Geier et al. | 259/9 X |
| 3,169,752 | 2/1965 | De Laubarede | 259/9 X |
| 3,189,324 | 6/1965 | Gubler | 259/109 X |
| 3,347,528 | 10/1967 | List et al. | 259/2 |
| 3,252,182 | 5/1966 | Colombo | 18/12 |
| 3,271,819 | 9/1966 | Lacher | 18/12 |
| 3,347,528 | 10/1967 | List et al. | 259/10 X |
| 3,358,327 | 12/1967 | Maillefer | 18/12 SM |
| 3,375,549 | 4/1968 | Geyer | 18/12 SM |
| 3,504,400 | 4/1970 | Natov et al. | 18/12 SM |
| 3,570,654 | 3/1971 | Hill | 198/213 |

FOREIGN PATENTS OR APPLICATIONS

| | | | |
|---|---|---|---|
| 1,066,467 | 10/1959 | Germany | 259/9 |

*Primary Examiner*—Jordan Franklin
*Assistant Examiner*—Geo. V. Larkin
*Attorney*—Charles A. Blank

[57] ABSTRACT

A screw conveyor for an extruder comprises a single rotatable screw which has a countercurrent first portion having a countercurrent land with interruptions therein for partially backfeeding plastic material to provide a turbulent current of plastic material. The screw conveyor has a second portion with two threads, one of which has radial grooves therein, to divide the current into partial streams flowing backwards but having further travel under a substantially steady forward feed to compact and intensively mix the plastic material.

11 Claims, 4 Drawing Figures

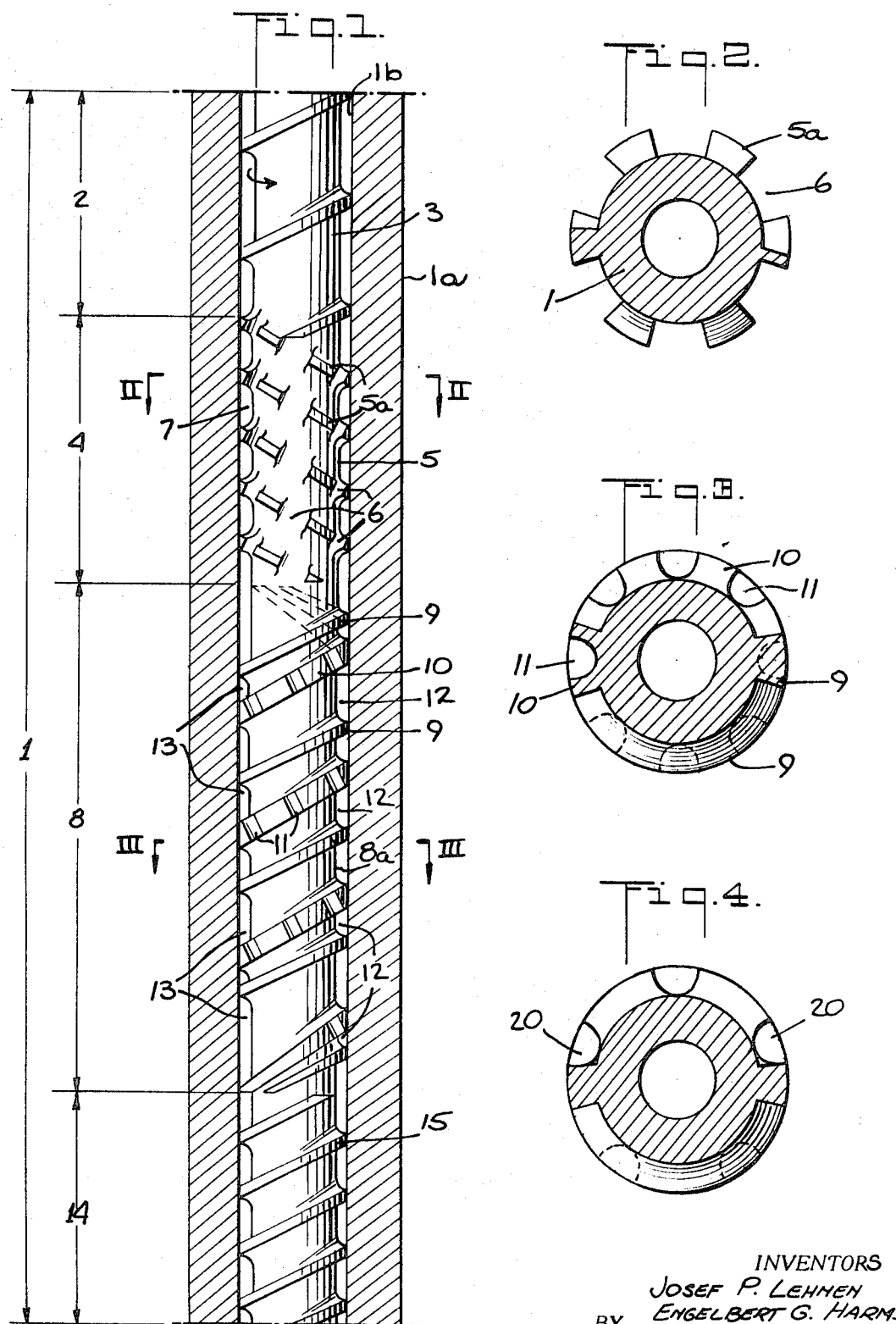

APPARATUS FOR CONVEYING PLASTIC MATERIAL

This application is a continuation-in-part of our copending application, Ser. No. 808,543, filed Mar. 19, 1969 and entitled "Apparatus and Method" now abandoned.

The invention relates to a process and a device for processing highly viscous materials, particularly rubber stocks with any desired proportions of natural rubber, in single-screw extruders.

As used herein, the terms "plastic" and "plastic material" are intended to mean materials which are rubber and the like.

To achieve a good quality of the extruded product, it is necessary by intensive kneading and mixing to bring about a balanced temperature distribution and thereby a uniform masticity, plasticity and homogeneity in the material. The quality of the extruded product depends on the interaction of the cylinder, the rotating screw and the die in the conveying, intermixing, masticizing, plasticizing, and homogenizing process during the passage of the material. The properties and dimensions of the extruded product are generally satisfactory if the material in the cylinder is plasticized mechanically and thermally into a homogeneous mass and deformed by a pressure constant with time in the die and is discharged at a constant rate.

Formerly, in processing rubber stocks in extruders it was customary to feed the extruder with an already masticated, plasticized and preheated material in the form of strips or pellets. Then the only task left to the extruder was to take hold of the already plastic stock, to convey it uniformly and to force it through a die. However, for economic considerations and for reasons of quality, the development in the extrusion of rubber stocks is shifting more and more from the so-called warm feed to cold feed extruders. The route from the stored prepared compound up to the final product with uniformly good quality should thereby be shortened and, above all else, be made continuous.

With regard to quality, the following requirements are made on the extruded product: uniform and perfect mixing throughout the cross section of the extruded product, dimensional stability within narrow tolerances, low variations in weight per meter, good and uniform surface properties, no blows or substantially none. These requirements cannot be met in processing on "warm feed" extruders, by reason of the differing residence times of the parts of the stock on the mixing mill and the variations in plasticity related thereto. Whereas, in the warm feeding of extruders, the already prewarmed and plastic stock is only conveyed, compressed and molded, in cold feeding it must additionally be heated to a certain temperature, masticated and plasticized.

Screw extruders for plastics are known for the processing of rubber, plastics or the like in which the screw is divided into segments of different configuration; for example the screw channel is interrupted at predetermined points, specifically by so-called mixing heads exhibiting the shape of polygonal prism. In this way the material, while being conveyed by the screw, is additionally subjected to a special shear. Moreover, in processing thermoplastic plastics in a screw extruder, the method is known to increase the plasticizing and masticating effect by causing the plasticized plastic to flow through a gap between the land of the screw and the inside wall of the screw cylinder. In this way it is to be achieved that the melt is separated from the solid phase of the plastic to be processed, during the conveying of the latter in the screw, and the liquid material is brought to a collecting receptacle which the components of the plastic that are still in the solid phase cannot reach. For this purpose radial channels are arranged in the screw land, which discharge into a channel running axially inside the root of the screw. Moreover, the process of separation of the liquid material from the still solid material in the screw extruder is to be achieved by decreasing the flow passage cross sections in the opposite directions down to the value of zero with a double-pitch screw and keeping the diameter of the one screw land a little larger than the diameter of the other screw land, so that the melt can pass over from one screw channel into the other, with the solid components being however retained.

With some such designs of the screws it has been found that, despite the greater screw lengths, a uniform heating and plasticizing of the stock could not be achieved with rubber stocks, especially not at higher production rates. The reason for this is to be found in the high structure viscosity of rubber stocks, which becomes particularly noticeable in stocks with higher proportions of natural rubber.

In processing rubber stocks, the following properties must be considered in particular: low thermal conductivity, non-Newtonian flow behavior, high apparent viscosity—laminar flow and temperature dependence of the apparent viscosity and plasticity. These properties prevent a uniform heating, intermixing, mastication and plasticizing, since only the particles of the material in contact with the heated cylinder wall or with the screw surface are heated up at first. This means a decrease in the apparent viscosity and hence localized flows in the vicinity of the wall. In addition, with an increasing speed gradient, the apparent viscosity decreases further and thus the slippage in the vicinity of the wall becomes even greater. By reason of the low thermal conductivity, the layers of material in the vicinity of the wall isolate the core of the material from the heat supply. This gives rise to greater temperature and viscosity differences, which have a disadvantageous effect on the quality of the extruded product.

It is the object of the invention to provide apparatus for processing of highly viscous materials, especially rubber stocks in a cold feed extruder while achieving a good quality of the end product with regard to kneading and mixing. The invention is characterized in that the stock of material, under heating during its feeding through the extruder, is dammed up for a certain length of travel, is partly backfed and, under intensive kneading, is carried over into a turbulent flow and, thereafter, for a further length of travel, is divided into communicating partial streams for a generally steady forward feed, is compacted and thereby intensively mixed.

This kind of two-stage system of processing within the screw extruder produces, first, a coarse mixing in which the material processed is already subjected to substantial kneading, masticating, and plasticizing. This is followed by a fine-mixing zone in which the mastication and plasticization is carried to completion. The material being processed, which is made up of many components, is then intermixed so that a homogeneous, uniformly masticated and plasticized stock, having the same temperature at all points, is delivered at a constant rate at the end of the screw. At the same time, the intermixed material is well compacted. It is possible economically to achieve in this way an optimum output. Moreover, the screw can be used for rubber stocks with any desired proportions of natural rubber.

The screw is preferably designed in such a way that next to an intake zone for the material there is arranged a segment with a countercurrent screw section whose lands exhibit interruptions, and this is followed by a segment in which there are provided two screw lands with the same radial wall clearance between the land and the inner wall of the cylinder and provided with a different pitch. In this case, the screw land, in front of which the screw channel becomes smaller in the feed direction, exhibits radial gaps on the periphery. In the first working zone with one or more counter current screw lands, a certain backfeeding of the material is achieved. This causes a damming up of the material counter to the general feed direction. In this way, the feed current is converted from a laminar into a turbulent flow. The material is subjected to an intensive turbulent motion, resulting in an excellent kneading throughout, as it had hitherto been carried out, but not been achieved, on the standard mill rolls or the like. In the subsequent working zone, the material processed is again forced to continue to mix further, with increasing compaction, so that, after the coarse premixing, the final intermixing is imparted to it. In both working zones, the above-mentioned properties of rubber stocks are taken into consideration in such a way that a homogeneity is obtained in the compound with regard to viscosity and temperature.

The screw land provided with radial gaps is preferably wider than the adjacent screw land in the second working zone. In this way the mixing of the material is increased upon backfeeding. It is furthermore significant that the two screw lands with different pitch taper off free at each end. In this way the mixing process is not disturbed.

After the second working zone, the material can be discharged directly by means of an extrusion die. Also, an output zone can be arranged with a single-threaded or multiple-threaded screw. Moreover the screw point can be designed as a torpedo head.

The invention is illustrated below on the basis of exemplified embodiments illustrated in the drawing.

FIG. 1 shows, schematically and in elevation, the design of a screw for a screw extruder for the processing of rubber stocks;

FIGS. 2 and 3, respectively, show, partly schematically, cross sections along lines II—II or III—III of FIG. 1 through the screw; and FIG. 4 represents, partly schematically, a cross section of another embodiment of the screw.

Referring to FIGS. 1, 2 and 3, the screw 1 in means 1A having a cylindrical elongated opening 1B therein shows throughout on the input side for the material an intake zone 2 in which there may be arranged one single-threaded, or two-threaded, or more than two-threaded screw segment 3 by means of which the material is being drawn into the extruder. This zone is followed by the working zone 4. In this zone there is provided one countercurrent single-threaded or multiple-threaded screw segment 5 wherein the lands 5a of the screw have interruptions 6 at intervals that may be regular or irregular. In this section, the flow of material is subdivided by a multiple breakup of the stream. As a result there occurs an intensive intermixing, a uniform temperature distribution and a balancing out of the fluctuations in plasticity. Depending on the size of the screw, the length of the working zone 4, as well as the pitch, and the cross sections of the channel 7 and the gaps 6 can be varied.

The mixing process is terminated in the subsequent part, the work zone 8. In this zone 8 as a fine-mixing zone there are superimposed, running in identical direction, on screw segment 8a two screw threads comprising lands 9 and 10 having the same radial wall clearance between the screw lands and the inner wall of the cylinder, but a different pitch and width of lands. The land 10 is interrupted at regular or irregular intervals by means of gaps 11. Also in this case the pitches, the widths of the lands, and the cross-sections of the gaps 11 may be varied, depending on the size of the screw. The screw land 10 is preferably designed to be wider than the screw land 9. By reason of the difference in the pitch of the lands 9 and 10, the channel cross sections 12 and 13 decrease in opposite directions down to a small opening. The main stream of the material enters the screw channel 12 and, because of the progressively diminishing passage cross section and the related pressure build up, is forced to flow through the gaps 11 into the screw channel 13. The division of the main stream into many partial streams directed backwards causes a further improvement in the quality of the mixture, a balancing out of the plasticity variations, and a uniform distribution of temperature. The pressure dissipating backwards likewise insures good compacting and homogenization of the material. The optimum operating temperature can be adjusted by means of temperature controls at the screw and cylinder parts. The screw lands 9 and 10 taper off free at the start and at the end, so that the channels 12 and 13 have free access to the adjacent zones. The depths of the gaps 11 and of the gaps 6 preferably are substantially equal to the elevations of the screw lands 10 and 5a, respectively, thereby avoiding portions of the stream from being retained near the core of the screw.

The material masticated, plasticized, and homogenized in the working zones 4 and 8 may be continuously fed to a single-pitch or multiple-pitch screw 15 of a standard outlet zone 14 or, by omitting the outlet zone, be fed directly to the extrusion die.

Referring to FIG. 4, there is represented the cross-section of an alternate screw in accordance with the invention having five gaps 20 per winding turn corresponding to gaps 11 of the screw of FIG. 1. Also, the screw of FIG. 4 has twice the diameter of the FIG. 1 screw and is generally similar to the FIG. 1 screw but with the various parameters of the FIG. 4 screw preferably being selected as described herein for the 90-millimeter screw.

The overall length of the screw, as well as the length of the various zone, may vary depending on the screw diameter as well as on the stock. The same holds true for the screw pitch and the elevation of the screw land. The described screw of the screw extruder can be applied to all cold feed extruders and cold feed injection molding machines.

The length of the screw segments in the intake, coarse-mixing, and fine-mixing zones increases, likewise, with increasing screw diameter. However, the increase in the length of the screw segments does not take place proportionally to the increase of the screw diameter. As indicated in the following table, it was found, for instance, that upon increasing of the diameter of the screw in a range from about 50 millimeters up to about 250 millimeters, there suffices, at a given doubling of the screw diameter, a screw length growth of all three screw segments 3, 5 and 8a considered as a whole by a factor increasing approximately with the amount 2 in each case. In that case, the numerical factor of the multiple of diameter representing the length of the screw segment of the fine-mixing zone may remain substantially unchanged, whereas the numerical factor of the multiple of diameter representing the lengths of the screw segments of the coarse mixing and of the intake zones are increased by approximately the same amount each, i.e., each factor increasing approximately by one.

With increasing lengths of the screw segments, one increases preferably also the land elevation of the screw channels. Taking into consideration the aforementioned range of increase of the screw diameter, the land elevation can, upon doubling of the screw diameter with respect to the lower range value, substantially triple or quadruple and, given an approximately quadrupled screw diameter, increase about six to sevenfold.

With any screw diameter, the pitch of the screw land may remain as the same multiple of diameter in the intake zone; in the coarse-mixing zone the pitch of the screw land may be allowed to increase up to about 30 percent with respect to the pitch of the screw land in the corresponding intake zone; whereas the pitch, in particular of the screw land, provided with gaps, in the fine-mixing zone, is preferably made substantially steeper with increasing screw diameter, namely by about 50 to 70 percent with respect to the pitch of the screw land in the corresponding intake zone.

The number of gaps in the screw lands of the coarse-mixing zone may increase approximately linearly with increasing screw diameter. In the case of the interrupted screw land of the fine-mixing zone, the number of gaps at same may increase at a substantially greater rate with increasing screw diameter depending on the conditions in the coarse-mixing zone. However, the number of gaps in the coarse-mixing zone is, with regard to the absolute number per winding turn, in some screws higher than the number of the gaps per winding turn at the steeper screw land of the fine-mixing zone. The widths of the interruptions in the screw lands of the coarse-mixing zone are preferably kept the same with all screw diameters. The widths of the gaps in the screw land of the fine-mixing zone are preferably kept the same with all screw diameters. It is to be aimed at that the overall area per winding turn of all interruptions in the screw lands of the coarse-mixing zone be greater than the overall area per winding turn of the gaps in the screw land of the fine-mixing zone, the increase of the area of the interruptions per winding turn of the coarse-mixing zone over the area of the gaps per winding turn of the fine-mixing zone being allowed to vary between 20 percent to 60 percent more than the area of the gaps per winding turn of the fine-mixing zone. The lower percentage values apply in this connection to the larger screw diameters.

Taking into consideration the achieving of a per se improved quality of the stock being processed, with all dimensions of the preferred apparatus in accordance with the invention, the output capacity of the apparatus described is substantially above that of devices hitherto known in the art.

The following table represents typical dimensions of experimental apparatus constructed in accordance with the invention:

|  | Screw Dimension Outside Diameter D, $D_1$, $D_2$, (millimeters) | | |
|---|---|---|---|
|  | D<br>45 | $D_1$<br>90 | $D_2$<br>200 |
| Length of sum of screw segments 3, 5, 8a in the ratio of length to diameter | SBR NR<br>10  12 | SBR  NR<br>12    14 | SBR  NR<br>14    16 |

The total length can also be defined mathematically by the introduction of a dimensionless length factor. This length factor "$l$" corresponds to the following values, depending on the mixed material, Synthetic Butyl Rubber (SBR) or Natural Rubber (NR), respectively.

$l_s = 10$ for Synthetic Butyl Rubber (SBR)
$l_n = 12$ for Natural Rubber (NR)

Accordingly, the length of sum of screw segments 3, 5, 8a can be calculated by the following formula:

$$L = l \cdot D; \; (l+2) \, D_1; \; (l+4) \, D_2,$$

whereby $l$ can be either $l_s = 10$ or $l_n = 12$, depending on the material to be processed.

For the 45-mm. screw for determining the total screw length of segments 3, 5 and 8a for Synthetic Rubber processing:
$L = l_s D$
$L = 10 \cdot 45$
$L = 450$ millimeters for Natural Rubber processing:
$L = l_n \cdot D$
$L = 12 \cdot 45$
$L = 540$ millimeters For the 90-millimeter screw for determining the total screw length of segments 3, 5 and 8a for Synthetic Rubber processing:
$L = (l_s + 2) \, D_1$
$L = (10 + 2) \, 90$
$L = 1,080$ millimeters for Natural Rubber processing:
$L = (l_n + 2) \, D_1$
$L = (12 + 2) \, 90$
$L = 1,260$ millimeters For the 200-millimeter screw for determining the total screw length of segments 3, 5 and 8a for Synthetic Rubber processing:
$L = (l_s + 4) \, D_2$
$L = (10 + 4) \, 200$
$L = 2,800$ millimeters for Natural Rubber processing:
$L = (l_n + 4) \, D_2$
$L = (12 + 4) \, 200$
$L = 3,200$ millimeters

|  | Screw Dimension Outside Diameter D, $D_1$, $D_2$ (millimeters) | | |
|---|---|---|---|
|  | D<br>45 | $D_1$<br>90 | $D_2$<br>200 |
| Distribution of lengths of zones as multiples of diameter |  |  |  |
| Intake zone 2 | 5D | $6D_1$ | $7D_2$ |
| Coarse-mixing zone 4 | 4.5D | $5D_1$ | $6D_2$ |
| Fine mixing zone 8 | 2.5D | $3D_1$ | $3D_2$ |
| Pitch depth (mm.) (Land Elevation) | 6 | 22.5 | 40 |
| Pitch as multiples of diameter |  |  |  |
| Screw segment 3 | 1D | $1D_1$ | $1D_2$ |
| Screw segment 5 | 1D | $1.34D_1$ | $1.32D_2$ |
| Screw Land 9 | 1D | $1.34D_1$ | $1.32D_2$ |
| Screw Land 10 | 1.16D | $2.34D_1$ | $1.82D_2$ |
| Number of Gaps or Interruptions per winding turn |  |  |  |
| For coarse-mixing zone 4 | 6 | 10 | 24 |
| For fine mixing zone 8 | 8 | 5 | 20 |
| Widths of Gaps or Interruptions (mm.) For coarse mixing zone 4 | 10.8 | 10 | 10 |
| For fine mixing zone 8 | 5 | 7 | 7 |
| Output capacity (kilograms per hour) | 40–60 | 200–250 | 1,000–1,500 |

While there have been described herein what are at present considered to be preferred embodiments of this invention, it will be obvious to those skilled in the art that various changes and modifications may be made therein without departing from the invention and it is, therefore, aimed to cover all such changes and modifications as fall within the true spirit and scope of this invention.

Having thus described our invention, what we claim and desire to protect by Letters Patent is:

1. Apparatus for conveying plastic material comprising:
means having a cylindrical elongated opening therein;
a screw conveyor comprising a single screw mounted for rotation in said cylindrical opening to convey plastic material;
said screw conveyor having a countercurrent first portion, having a countercurrent land with interruptions therein, by which the plastic material is partially backfed to provide a turbulent first current of plastic material;
said screw conveyor having a second portion comprising means for dividing said first current of plastic material into partial streams of current flowing backwards but having further travel under a substantially steady forward feed to compact and intensively mix the plastic material.

2. Apparatus for conveying plastic material comprising:
means having a cylindrical elongated opening therein;
a screw conveyor comprising a single screw mounted for rotation in said cylindrical opening to convey plastic material;
said screw conveyor having a countercurrent first portion, having a countercurrent land with interruptions therein, by which the plastic material is partially backfed to provide a turbulent first current of plastic material;
said screw conveyor having a second portion having two interlaced threads having lands for both threads with the same outer land radial wall clearance for both threads, said threads having a different pitch, said lands of said second portion tapering off free at both ends;
said lands of said threads forming channels one of which decreases in width in the forward feed direction and the other of which increases in width in the forward feed direction, the land in front of which the screw channel decreases in width in the forward feed direction having radial gaps at its periphery for dividing said first current of plastic material into partial streams of current flowing backwards but having further travel under a substantially steady forward feed to compact and intensively mix the plastic material.

3. Apparatus in accordance with claim 2 in which said screw land having radial gaps therein is wider than the other screw land of said threads.

4. Apparatus in accordance with claim 2 in which the number of interruptions per winding turn of said land of said first screw conveyor portion is greater than the number of said radial gaps per winding turn of said second screw conveyor portion.

5. A screw conveyor for plastic material adapted to be rotatably mounted in an elongated cylindrical opening comprising:
a single screw having a countercurrent first portion, having a countercurrent land with interruptions therein, by which the plastic material is partially backfed and is dammed up to provide a turbulent first current of plastic material;
and said single screw having a second portion comprising means for dividing said first current of plastic material into partial streams of current flowing backwards but having further travel under a substantially steady forward feed.

6. Apparatus in accordance with claim 1 in which said screw conveyor has an input portion comprising a screw portion having at least one thread.

7. Apparatus in accordance with claim 1 in which said screw conveyor has an output portion comprising a screw portion having at least one thread.

8. A screw conveyor for plastic material adapted to be rotatably mounted in an elongated cylindrical opening bounded by a wall comprising:

a rotatable shaft extending through said opening;

first and second interlaced helical threads on said shaft extending therefrom toward the wall of said opening and having different pitches, said first and second threads having lands with the same radial wall clearance between said lands and the wall of said opening, said lands of said threads forming channels one of which decreases in width in the forward feed direction and the other of which increases in width in the forward feed direction, the land in front of which the channel decreases in width in the forward feed direction having radial gaps along the land at its periphery, the depths of said gaps being substantially equal to the elevation of said land having said gaps therein.

9. A screw conveyor in accordance with claim 8 in which said shaft is a single shaft having a countercurrent land with interruptions therein to form a countercurrent first portion, said shaft having a second portion with said first and second helical threads.

10. A screw conveyor in accordance with claim 9 in which said interruptions of said countercurrent land have depths substantially equal to the elevation of said countercurrent land.

11. A screw conveyor in accordance with claim 9 in which the area per winding turn of said interruptions of said countercurrent land is greater than the area per winding turn of said gaps of said one of said threads.

* * * * *